US011550482B2

(12) United States Patent
Lidman et al.

(10) Patent No.: US 11,550,482 B2
(45) Date of Patent: Jan. 10, 2023

(54) PAGE-BASED MEMORY ACCESS CONTROL

(71) Applicant: Synaptics Incorporated, San Jose, CA (US)

(72) Inventors: Pontus Evert Lidman, Saratoga, CA (US); Fook Shian Toong, Sunnyvale, CA (US); Jingliang Li, San Jose, CA (US); Hongjie Guan, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 156 days.

(21) Appl. No.: 16/844,203

(22) Filed: Apr. 9, 2020

(65) Prior Publication Data
US 2021/0318812 A1    Oct. 14, 2021

(51) Int. Cl.
*G06F 3/06* (2006.01)
*G06F 12/1009* (2016.01)

(52) U.S. Cl.
CPC .......... *G06F 3/0622* (2013.01); *G06F 3/0658* (2013.01); *G06F 3/0673* (2013.01); *G06F 12/1009* (2013.01)

(58) Field of Classification Search
CPC .. G06F 12/1009; G06F 3/0622; G06F 3/0658; G06F 3/0673; G06F 2212/1052; G06F 3/0638; G06F 3/0679; G06F 12/1475; G06F 12/1416
See application file for complete search history.

(56) References Cited

U.S. PATENT DOCUMENTS

| | | | |
|---|---|---|---|
| 2018/0356992 A1* | 12/2018 | Lamberts | G06F 3/0685 |
| 2019/0042463 A1* | 2/2019 | Shanbhogue | G06F 12/1408 |
| 2019/0129862 A1* | 5/2019 | Yoshida | G06F 12/0246 |
| 2019/0147192 A1* | 5/2019 | Khosravi | H04L 9/0894 |
| | | | 713/192 |
| 2019/0155637 A1* | 5/2019 | Yu | G06F 12/109 |
| 2019/0258420 A1* | 8/2019 | Olderdissen | G06F 3/0659 |

* cited by examiner

*Primary Examiner* — Zhuo H Li
(74) *Attorney, Agent, or Firm* — Paradice & Li LLP (57) ABSTRACT

A method and apparatus for controlling access to memory is disclosed. In one implementation, a memory controller may receive a memory access request that may include a virtual memory address, a device identifier (ID) and a protected access indicator. Additionally, the memory controller can receive page table entries including a physical memory address based on the virtual memory address and a security attribute associated with the physical memory address. The memory controller may access a memory based on the physical memory address, the security attribute, the protected access indicator, and the device ID.

17 Claims, 4 Drawing Sheets

PAGE-BASED MEMORY ACCESS CONTROL

TECHNICAL FIELD

This disclosure relates generally to memory access control, and more specifically to systems and methods for page-based memory access control.

BACKGROUND OF RELATED ART

Many computing devices use memory management techniques to provide access to physical memory for a variety of devices and programs. Some memory management techniques use the concept of a virtual memory to abstract storage resources that are physically available to the computing device. Conventionally, virtual memory uses addresses in a virtual address space to refer to one or more regions of a physical memory. The one or more regions of the physical memory are sometimes referred to as memory pages. Access to some memory pages may be restricted to certain devices or programs. A memory or look-up table may be used to keep track of the access restrictions. Typically, each memory page requires at least one entry in the look-up table. Smaller memory page sizes (e.g., in the range of 4 kilobytes), may provide a finer grained memory page structure by using more pages to refer to a memory space. More memory pages may also increase the size of the look-up table tracking the access restrictions. These large memories or look-up tables may require increased or substantial die area, increasing costs associated with on-chip memory.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for accessing memory is disclosed. One innovative aspect of the subject matter of this disclosure can be implemented by a memory controller. The memory controller can receive a memory access request that includes a virtual memory address and a device identifier (ID). The memory controller can retrieve a physical memory address associated with the virtual memory address and a security attribute associated with the physical memory address. The memory controller may respond to the memory access request by selectively accessing a memory region based on the physical memory address, the security attribute, and the device ID.

Another innovative aspect of the subject matter of this disclosure can be implemented in a memory controller including a memory management unit and an access controller. The memory management unit may be configured to receive a memory access request that includes a virtual memory address and a device identifier (ID). Further, the memory management unit also may be configured to receive a physical memory address associated with the virtual memory address and a security attribute associated with the physical memory address. The access controller may be coupled to the memory management unit and be configured to respond to the memory access request by a selective access to a memory region based on the physical memory address, the security attribute, and the device ID.

Yet another innovative aspect of the subject matter of this disclosure can be implemented as a memory controller comprising a means for receiving a memory access request including a virtual memory address and a device identifier (ID). The memory controller also may comprise a means for receiving a physical memory address associated with the virtual memory address and a security attribute associated with the physical memory address. Further, the memory controller also may comprise a means for responding to the memory access request by selectively accessing a memory region based on the physical memory address, the security attribute, and the device ID.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the implementations disclosed herein may be executed by one or more processors. The term "processor," as used herein may refer to any general purpose processor, conventional processor, special purpose processor, controller, microcontroller, and/or state machine capable of executing scripts or instructions of one or more software programs stored in memory.

Various implementations relate generally to memory access control. Some implementations more specifically relate to a system and method to control access to physical memory. A first mechanism to control memory access may divide the physical memory into two regions. A first region, referred to as a protected region, may include regions of memory where read and/or write access is controlled or restricted based on a protected access identifier. A second region, referred to as a non-protected region, may include regions of memory that do not depend on the protected access identifier for read and/or write access control restrictions. In some implementations, the protected region of memory may store one or more page tables that may be used to map virtual memory addresses to physical memory addresses. Virtual memory management is described in more detail below. A second mechanism to control memory access may involve security attributes. Security attributes may indicate which devices or programs have read and/or write access to certain regions in the non-protected memory region. In some implementations, the use of security attributes may be optional. Security attributes and their usage are described in more detail below.

Particular implementations of the subject matter described in this disclosure can be implemented to realize one or more of the following potential advantages. In some implementations, the described techniques can be used to enable a secure data processing chain where access to memory may be limited to certain devices or processes. For example, some devices or processes may have memory access restricted to read operations in some regions of memory while other devices may have memory accesses restricted to write operations. Furthermore, the page table entries may be stored in main memory instead of on-chip memory, reducing die area requirements.

Figure 1:
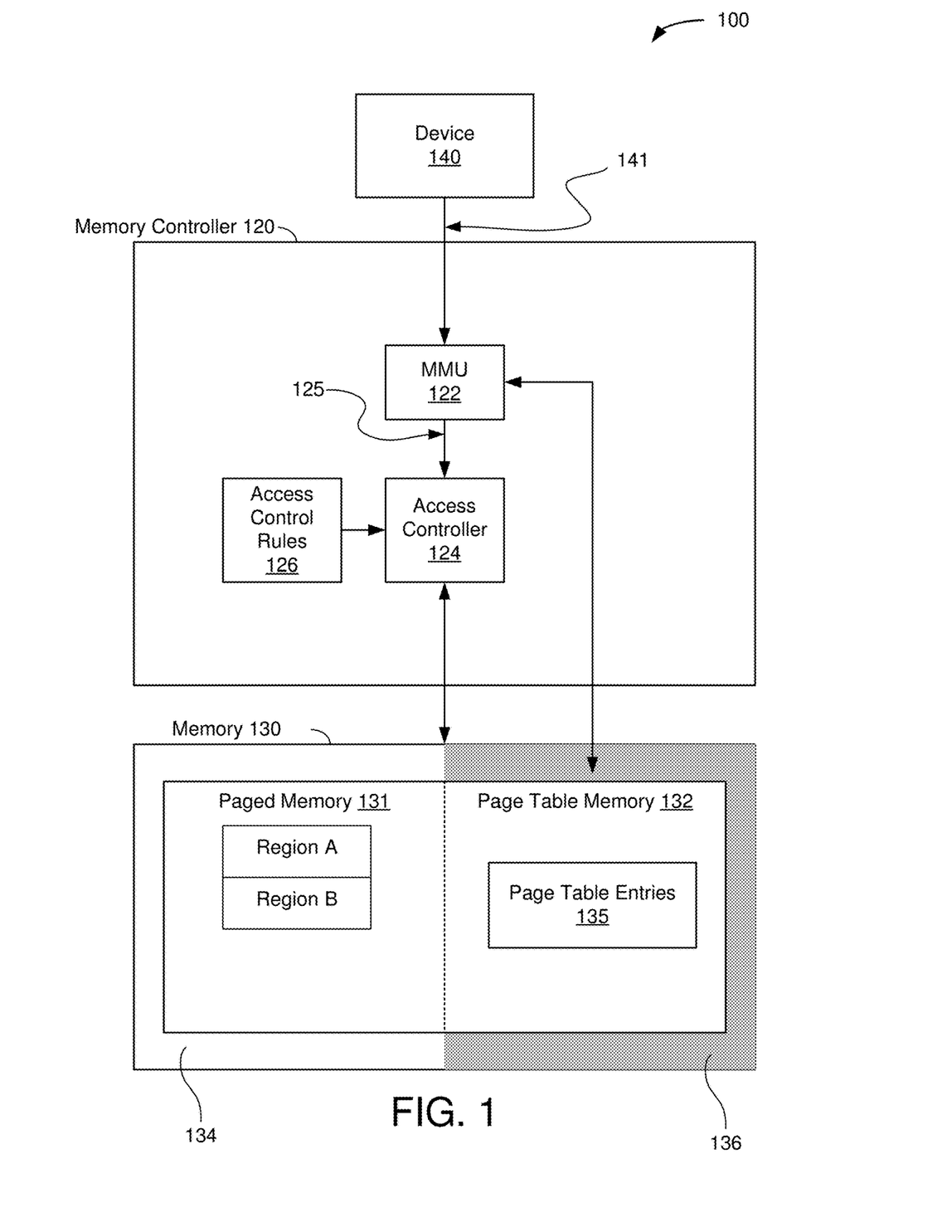
FIG. 1 is a block diagram of a processing system in accordance with some implementations.

FIG. 1 is a block diagram of a processing system 100, in accordance with some implementations. The processing system 100 may include a memory controller 120, memory 130, and a device 140. The device 140 may be any feasible device, process, or task to read or write the memory 130 through the memory controller 120. For example, the device 140 may be a video stream source, a digital audio stream source, a process to render MPEG transport stream data stored in the memory 130, a process to output a rendered image to a display, or any other feasible source or recipient of data. Although only one device 140 is shown here for simplicity, the processing system 100 may include any number of devices 140. In some implementations, the device 140 may be a processor, CPU, or the like. In some embodiments, a single CPU or processor may operate as two or more devices, where each device may be associated with a task or program that accesses memory. For example, a first device may be associated with a secure data processing chain and a second device may be associated with a non-secure data processing chain. Secure and non-secure data processing chains are described in more detail below. Furthermore, each device 140 may be assigned or be associated with a unique device identifier (device ID) to identify the respective device. The device ID may be predetermined or dynamically assigned. In some embodiments, the device ID may be assigned by an operating system. In some implementations, the memory 130 may be a main memory of the processing system 100 and be separate (e.g., off-chip) with respect to the device 140 and the memory controller 120.

The memory controller 120 may include a memory management unit (MMU) 122, an access controller 124, and access control rules 126. The memory 130 may be coupled to the MMU 122 through the access controller 124. The memory 130 may include paged memory 131 (so called because the memory in the paged memory 131 may be arranged into regions or blocks of memory referred to as "memory pages") and page table memory 132. Paged memory 131 may be used to store any feasible data for use by the device 140. For example, the paged memory 131 may be used to store initial, intermediate, and/or rendered media data. The page table memory 132 may include one or more page table entries 135 that map virtual memory addresses received by the MMU 122 to physical memory addresses of the memory 130.

Virtual memory management techniques may enable the processing system 100 to abstract the memory usage of the memory 130. For example, the operating system may assign virtual memory addresses, to particular programs, which map to one or more addresses in physical memory. In this manner, memory usage and requirements associated with a program may be decoupled from actual available physical memory. In some cases, virtual memory management techniques enable the amount of allocated virtual memory to exceed available physical memory. In some implementations, the virtual memory addresses may be mapped by the MMU 122 through the page table entries 135 in the page table memory 132 to regions of the paged memory 131. Further, the page table entries 135 may include a security attribute that is also associated with the mapped region of paged memory 131. The security attribute may be an integer value that indicates a security domain (or domains) associated with the memory page. In some aspects, the security domain may be used to control access to the memory page by one or more devices 140 (as identified by their device ID). In some implementations, the memory 130 may include a protected region 136 (shown as shaded) and a non-protected region 134 (shown as not shaded). Access to the protected region 136 of memory 130 may be restricted to certain devices 140 while access to the non-protected region may not have access restrictions. In some implementations, sensitive data, such as the page table memory 132, may be stored in the protected region 136, while non-sensitive data (e.g., paged memory 131) may be stored in the non-protected region 134. Memory within the protected region 136 may only be accessed by a device 140 in conjunction with a protected access indicator. The protected access indicator is described in more detail below.

A memory access request may originate from the device 140 and be included in device data 141 provided to MMU 122 of the memory controller 120. In some implementations, the device data 141 may include the device ID, a requested memory address, a read/write indicator, and a protected access indicator. The device ID identifies the requesting device, e.g., device 140. The requested memory address is the memory address to which the requesting device 140 is requesting access. The read/write indicator indicates whether the memory access request is for a read or a write access. The protected access indicator indicates whether the memory access request is associated with memory in the protected region 136.

The MMU 122 may retrieve a page table entry 135 from the page table memory 132 based on the requested memory address in the device data 141. In some implementations, the requested memory address may include a virtual memory address. The page table entry 135 may map or translate the virtual memory address to a physical memory address (e.g., a memory page) in the paged memory 131 as well as provide security attributes associated with the paged memory 131. As described above, the security attributes may be used to control device 140 access with respect to one or more memory pages.

The MMU 122 may generate MMU data 125 based on the device data 141 and the page table entry 135. The MMU data 125 may include, a physical memory address, security attributes associated with the physical memory address, the device ID, a read/write indicator, and a protected access indicator. The physical memory address and the security attributes may be determined from the page table entry 135. The device ID, the read/write indicator, and the protected access indicator may be determined from the device data 141.

The access controller 124 may permit or deny the memory access request included in the MMU data 125. In some implementations, operation of the access controller 124 may be guided at least in part by the access control rules 126. For example, the access control rules 126 may specify that some devices 140 are permitted to access some regions or pages of the memory 130, while specifying that other devices 140 are not permitted to access the same regions or pages based on security attributes, read/write operations, and/or access to the protected region 136. Thus, the access controller 124 may apply access control rules 126 to permit or deny access to the memory 130.

As described above, the access control rules 126 may restrict the access of some devices 140 to the memory 130. In some aspects, the restriction may be based on read and write operations. For example, certain devices 140 may be prevented from reading and/or writing certain regions of the memory 130. Further, some devices may have no access restrictions (all reads and writes are allowed) and some devices may be restricted from any type of access (no reads or writes are allowed). Thus, the access control rules 126 may indicate whether a device has access to the memory 130 to perform the type of operation (e.g., read or write) indicated in the MMU data 125.

Access to the page table memory 132 may be tightly controlled. For example, only certain high-level programs or processes may be allowed to read or write to the page table memory 132 located within the protected region 136 of the memory 130. Access to the protected region 136 may be controlled at least in part by the protected access indicator in the MMU data 125 and the access control rules 126. For example, in a first state, the protected access indicator may indicate that the device 140 is requesting access to the protected region 136 of memory 130, and in a second state, the protected access indicator may indicate that the device 140 is not requesting access the protected region 136 of memory 130. The first state and the second state of the protected access indicator may, in some implementations, be different states of a hardware or software bit or flag. The access controller 124 may permit the device 140 to access the protected region 136 of memory 130 based at least in part on the access control rules 126, the device ID and the protected access indictor in the MMU data 125. Although restricting write access to the protected region 136 is described above, in some embodiments, read access to the protected region 136 may be restricted in a similar manner.

To illustrate an example memory access, a memory access request may originate from the device 140. As described above, the device 140 may be a physical device (e.g., TV tuner, optical disk drive, etc.), process, or task (e.g., transport stream receiver, graphics rendering routine, etc.). Each device 140 may be assigned a device ID. To access memory 130, the device 140 provides device data 141 to the MMU 122. The device data 141 may include its device ID, a requested memory address, a read/write indicator, and a protected access indicator. In some cases, the requested memory address may be a virtual memory address.

The MMU 122 can translate a virtual memory address (included in a requested memory access) into a physical memory address associated with memory 130 using one or more page table entries 135 retrieved from page table memory 132. For example, the MMU 122 may receive device data 141 which includes a virtual memory address, retrieve a page table entry 135 (from the page table memory 132) associated with the virtual memory address, and use the page table entry 135 to map the virtual memory address to a physical memory address in the paged memory 131. In some implementations, the page table entry 135 may further include one or more security attributes associated with the physical memory address.

In some implementations, the security attribute may be an integer value that describes which devices 140 have access to a memory page or physical memory address in the memory 130. The security attribute may also control read and/or write access to the memory 130 with respect to the device 140. The security attributes may provide a flexible and programmable means of controlling which devices may have read and/or write access to data in the memory 130. For example, consider three devices A, B, and C. The device A may be an input device, the device B may be a processing device, and the device C may be an output device. As shown, the paged memory 131 may include two separate memory regions, a region A and a region B, (that in turn may include one or more memory pages). Each region A and B may have different security attributes. Security attributes associated with region A may indicate that region A is writeable by device A, and readable (but not writeable) by device B. Further, security attributes associated with region B may indicate that region B is writeable by device B, and readable by device C. Thus, device A may receive input and write the input to region A. Next, device B may read data from region A, process the data, and write the processed data to region B. Finally, device C may read the processed data from region B and output the result. Thus, the security attributes allow device A to "see" the input received but not the processing result. Similarly, device C can "see" the processed result but cannot access the original input data. In this manner, a secure data processing chain involving devices A, B, and C can be formed. The data processing may be referred to as "secure" since some devices may have restricted read and/or write permissions with respect to certain memory regions.

Alternative ways to control access to particular memory regions by certain devices without security attributes are possible. For example, a system of software or hardware flags may be used by the devices to regulate memory access. However, the use of software and/or hardware flags may be significantly less secure than the use of security attributes since access to the software and/or hardware flags may be uncontrolled. In contrast, the security attributes are protected within the protected region 136.

Figure 2:
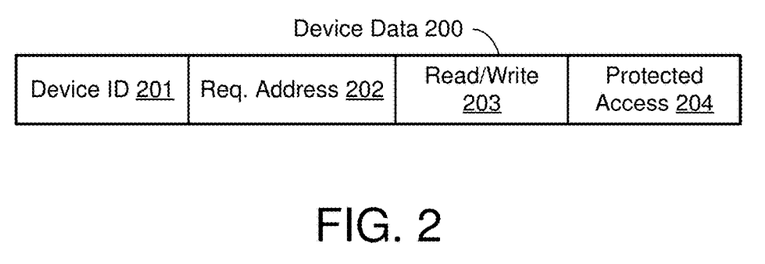
FIG. 2 is a block diagram of device data, in accordance with some implementations.

FIG. 2 is a block diagram of device data 200, in accordance with some implementations. The device data 200 may be an implementation of the device data 141 of FIG. 1 and may include a device ID field 201, a requested memory address field 202, a read/write indicator field 203, and a protected access indicator field 204. The fields 201-204 are shown in no particular order in the example of FIG. 2. Other implementations of the device data 200 may include more, fewer, and/or different fields in any feasible order. Further, although described as fields, the device ID field 201, the requested memory address field 202, the read/write indicator field 203, and the protected access indicator field 204 may be implemented with any number of bits and/or any feasible combination of hardware and software.

The device ID field 201 may include the device ID that uniquely identifies the device, process, or task associated with the memory access request of the device data 200. The requested memory address field 202 may include any memory address associated with the memory access request. In some embodiments, the requested memory address field 202 may include a virtual memory address or a physical memory address. The read/write indicator field 203 may indicate whether the memory access request is associated with a read or write operation. The protected access indicator field 204 may indicate whether the memory access request is associated with the protected region 136 of memory 130.

Figure 3:
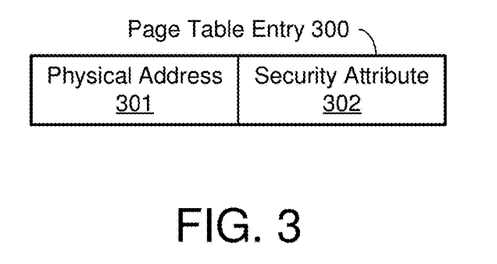
FIG. 3 is a block diagram of a page table entry, in accordance with some implementations.

FIG. 3 is a block diagram of a page table entry 300, in accordance with some implementations. The page table entry 300 may be an implementation of the page table entry 135 of FIG. 1 and may include a physical memory address field 301, and a security attribute field 302. The fields 301-302 are shown in no particular order in the example of FIG. 3. Other implementations of the page table entry 300 may include more, fewer, and/or different fields in any feasible order. Further, although described as fields, the physical memory address field 301 and a security attribute field 302 may be implemented with any number of bits and/or any feasible combination of hardware and software.

The physical memory address field 301 may include a physical memory address of a memory location based on the requested memory address field 202 of the device data 200. When the requested memory address field 202 includes a virtual memory address, the virtual memory address may be mapped to a physical memory address by the page table entry 300, and more particularly, by the physical memory address field 301. The security attribute field 302 may include an integer value describing security attributes associated with the physical memory address field 301. As described above, the security attributes in the security attribute field 302 may describe which devices 140 have access to the memory 130 associated with the physical memory address field 301.

Figure 4:
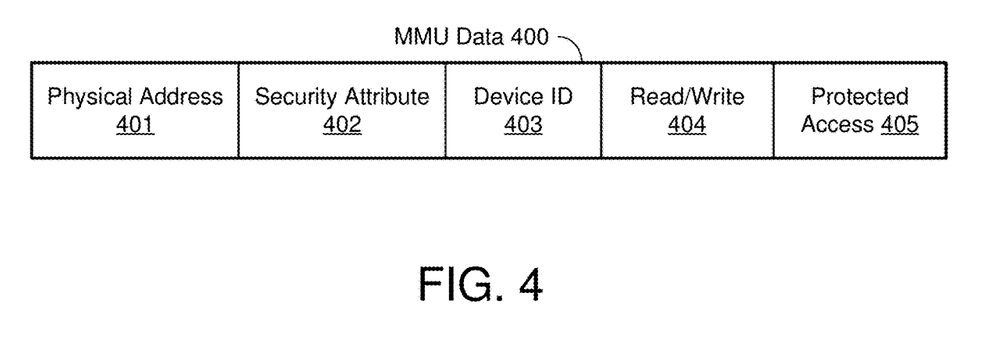
FIG. 4 is a block diagram of MMU data, in accordance with some implementations.

FIG. 4 is a block diagram of MMU data 400, in accordance with some implementations. The MMU data 400 may be an implementation of the MMU data 125 of FIG. 1 and may include a physical memory address field 401, a security attribute field 402, a device ID field 403, a read/write indicator field 404, and a protected access indicator field 405. The fields 401-405 are shown in no particular order in the example of FIG. 4. Other implementations of the MMU data 400 may include more, fewer, and/or different fields in any feasible order. Further, although described as fields, the physical memory address field 401, the security attribute field 402, the device ID field 403, the read/write indicator field 404, and the protected access indicator field 405 may be implemented with any number of bits and/or any feasible combination of hardware and software.

The physical memory address field 401 may include a physical address of the memory 130. In some implementations, the physical memory address field 401 may be the same, or substantially similar to the physical address information in the physical memory address field 301 of the page table entry 300 of FIG. 3. The security attribute field 402 may include an integer value describing security attributes associated with the physical address in the physical address field 401. In some implementations, the security attribute field 402 may be the same, or substantially similar to the security attribute information in the security attribute field 302. The device ID field 403 may include device ID information the same as, or substantially similar to, information in the device ID field 201 of the device data 200 of FIG. 2. The read/write indicator field 404 may indicate whether the memory access request is associated with a read or write operation. In some implementations, the read/write indicator field 404 may be the same as, or substantially similar to, information in the read/write indicator field 203. The protected access indicator field 405 may indicate whether the associated memory access is associated with a protected region 136 of memory 130. In some implementations, the protected access indicator field 405 may be the same as, or substantially similar to the information in the protected access indicator field 204.

Figure 5:
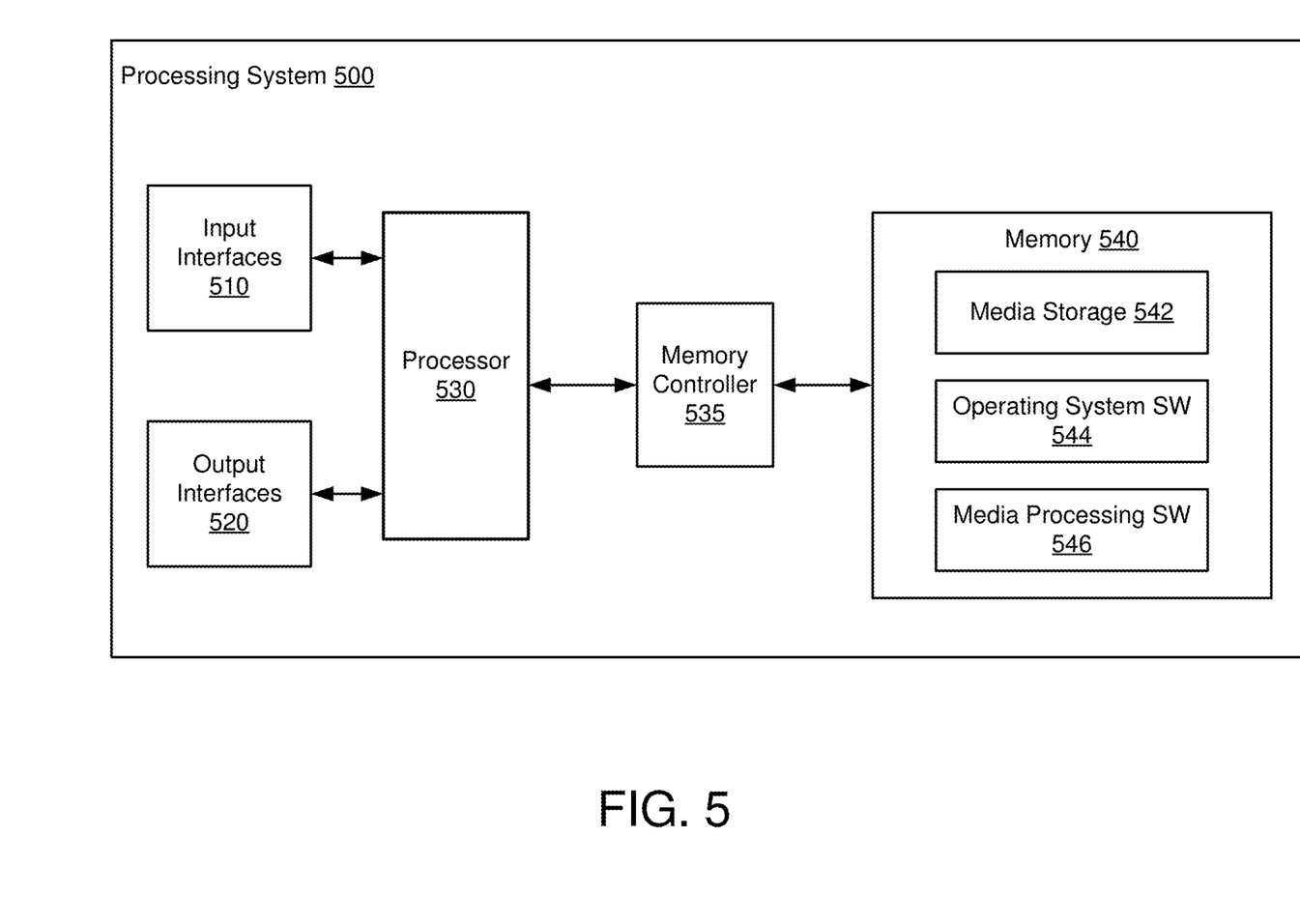
FIG. 5 is another block diagram of a processing system, in accordance with some implementations.

FIG. 5 is a block diagram of a processing system 500 in accordance with some implementations. The processing system 500 may include input interfaces 510, output interfaces 520, a processor 530, a memory controller 535, and a memory 540. Other implementations of the processing system 500 may include more or fewer devices, blocks, units, interfaces, or the like, and may be an implementation of the processing system 100 of FIG. 1. The processing system 500 may receive data and user input through the input interfaces 510 and may output data through the output interfaces 520. Some examples of a processing system 500 may include general purpose processing devices as well as media processing devices. Some example general purpose processing devices may include personal computing devices (e.g., desktop computers, laptop computers, netbook computers, tablets, e-book readers, and the like). Some example media processing devices may include recorders, editors, and players such as televisions, set-top boxes, music players, digital photo frames, and digital cameras. In some implementations, the processing system 500 may receive data, including media data, through the input interfaces 510. Some example the input interfaces 510 may include an ethernet port, a video receiver, a television (TV) turner, a keyboard, a touchpad, a mouse, or the like. Thus, the input interfaces 510 may receive data such as digital video, MPEG transport streams, as well as user input to control the processing system 500. Some input interfaces 510 may be configured to receive user input and may include, keyboard, mouse, touchpad, and touchscreen interfaces, or the like The output interfaces 520 may be used to provide data to output devices such as displays, speakers, or the like. One example output interface 520 may include an HDMI interface to provide display and/or audio data to a display and/or speakers. In another example, the output interfaces 520 may include an analog video output interface such as a composite or component analog interface that may be coupled to an analog display device.

The processor 530 may process, decode, and/or transform the data received from the input interfaces 510. The processor 530 may then provide the processed data to the output interfaces 520. In some aspects, the processed data may include processed audio and/or video media data. In some implementations, the processor 530 may be referred to as a System-on-Chip (SoC) processor. The processor 530 may be coupled to the memory controller 535. Similar to the memory controller 120 of FIG. 1, the memory controller 535 may include an MMU, an access controller, and access control rules, not shown here for simplicity. The memory controller 535 may control access to the memory 540. In some implementations, the memory controller 535 may enable devices, processes, or tasks to access the memory 540 through virtual addresses that are mapped to a physical address, region, or page of the memory 540.

The memory 540 may include a media storage region 542 that can be used to store any feasible data, including media data. In some implementations, the media data may be received through the input interfaces 510.

The memory 540 may include a non-transitory computer-readable storage medium (such as one or more nonvolatile memory elements, such as EPROM, EEPROM, Flash memory, a hard drive, and so on) that may store the following software modules:

Operating system software (SW) module 544 to control operations of the processing system 500; and Media processing SW module 546 to processes media data.

The processor 530 may be coupled to the input interfaces 510, the output interfaces 520, the memory controller 535, and the memory 540, may be any one or more suitable controllers, processors, state machines or the like capable of executing scripts or instructions of one or more software programs stored in the processing system 500 (e.g., within the memory 540). In some embodiments, the processor 530 and/or the memory controller 535 may be implemented with a hardware controller, a processor, a state machine, or other circuits to execute instructions stored in the memory 540. Thus, although execution of operating system SW module 544 and the media processing SW module 546 is described as performed by the processor 530 herein, the execution may also or alternatively be performed by the memory controller 535.

The processor 530 may execute the operating system SW module 544 to control operations, including memory operations, associated with the processing system 500. For example, the processor 530 may execute the operating system SW module 544 to receive user input through the input interfaces 510 to control the processing system 500. In another example, the processor 530 may execute the operating system SW module 544 to receive media data through the input interfaces 510 and store the media data via the memory controller 535 in the media storage region 542. In yet another example, the processor 530 may execute the operating system SW module 544 to output media data from the media storage region 542 through the output interfaces 520. In some aspects, the memory controller 535 may permit or deny memory accesses needed to receive and output data from the memory 540.

The processor 530 may execute the media processing SW module 546 process the media data. For example, the processor 530 may decode, transform, and/or render the media data in the media storage region 542 via the memory controller 535. In some aspects, the media data may be MPEG data from an MPEG transport stream. Thus, execution of the media processing SW module 546 may generate and/or render MPEG display data for display through the output interfaces 520. In some aspects, the memory controller 535 may permit or deny memory accesses needed to process media data in the memory 540.

Figure 6:
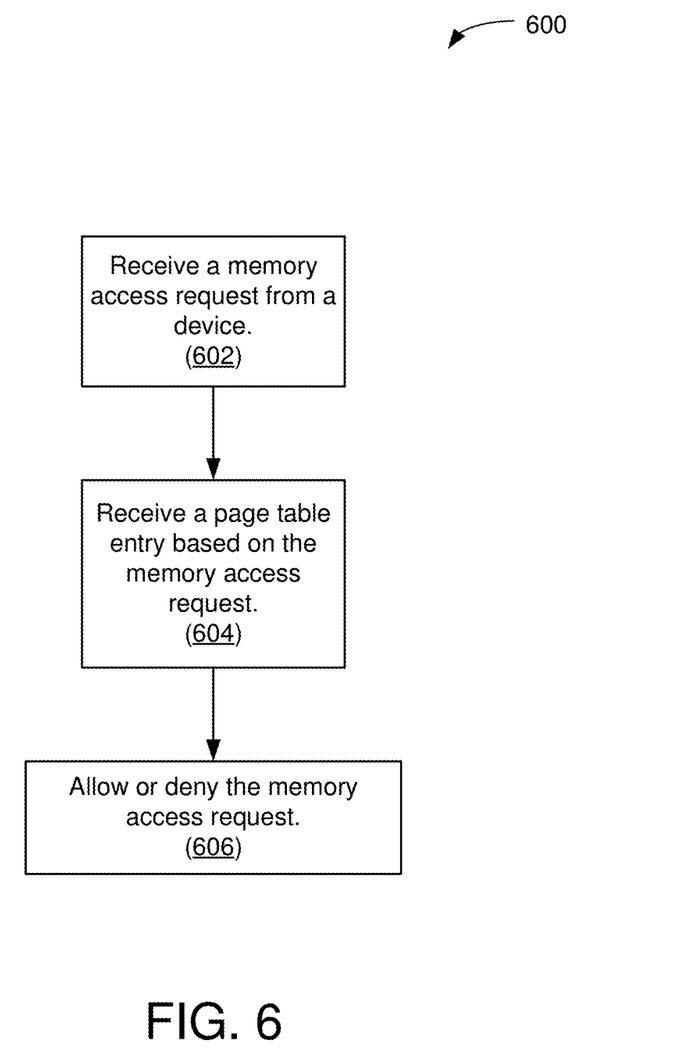
FIG. 6 is an illustrative flow chart depicting an example operation for accessing memory, in accordance with some implementations.

FIG. 6 is an illustrative flow chart depicting an example operation 600 for accessing memory, in accordance with some implementations. By way of example, the operation 600 may be performed by the processor 530 of FIG. 5. In other embodiments, the operation 600 may be performed by the memory controller 120 of FIG. 1, any feasible processor (including a general-purpose processor), a state machine, the memory controller 535 of FIG. 5, or any other technically feasible device, circuit, or module. In some embodiments, the operation 600 may include fewer or more operational steps than those depicted in the example of FIG. 6. Further, two or more of the operational steps may be performed in a different order and/or in parallel.

The processor 530 may receive a memory access request from a device (602). As described herein, a memory access request is a request by a device to read or write one or more addresses of a memory, such as the memory 130. The memory access request may include a device ID, a requested memory address, a read/write indicator, and a protected access indicator. The device ID may identify the device requesting memory access. The requested memory address may include a physical or virtual memory address. The read/write indicator may indicate whether the requested memory access is associated with a read or write operation. The protected access indicator may indicate whether the memory access is associated with a region of protected memory. In some implementations, the memory access request may be received in an implementation of the device data 141 of FIG. 1 or the device data 200 of FIG. 2.

Next, the processor 530 may receive a page table entry 135 based at least in part on the memory access request (604). The page table entry 135 may include a translation (e.g., a mapping) of the requested memory address to a physical memory address. In some implementations, the requested memory address is a virtual memory address that is mapped to a physical memory address by the page table entry 135. The page table entry 135 may also include a security attribute that describes which devices 140 have access to the memory associated with the physical memory address. In some implementations, the page table entry 135 may be an implementation of the page table entry 300 of FIG. 3.

Next, the processor 530 may determine whether to permit or deny the memory access request (606). The processor 530 may receive the device data (described in 602) and the page table entry (described in 604). The processor 530 may use the device data and the page table entry to determine whether to allow or deny the memory access request.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a memory controller, comprising:
   receiving a memory access request including a virtual memory address and a device identifier (ID);
   retrieving, from a page table in a memory, a physical memory address that is associated with the virtual memory address and indicates a location in the memory;
   retrieving, from the page table, a security attribute that is associated with the physical memory address and indicates whether a device associated with the device ID is permitted to access the location indicated by the physical memory address; and
   responding to the memory access request by selectively accessing the location in the memory indicated by the physical memory address based at least in part on the security attribute and one or more access control rules associated with the device ID.

2. The method of claim 1, wherein the selective access to the location indicated by the physical memory address is further based on a type of access associated with the memory access request, the type of access including at least one of a read access, a write access, or a protected memory access.

3. The method of claim 2, wherein the responding comprises:
   accessing the location indicated by the physical memory address with the access control rules for the device ID.

4. The method of claim 1, wherein the page table is stored within a protected partition of the memory.

5. The method of claim 4, wherein selective access to the protected partition of the memory is based on a protected access indicator included in the memory access request.

6. The method of claim 1, wherein the memory is separate from the memory controller.

7. A memory controller comprising:
   a memory management unit configured to:
     receive a memory access request including a virtual memory address and a device identifier (ID);
     receive, from a page table in a memory, a physical memory address that is associated with the virtual memory address and indicates a location in the memory; and
     receive, from the page table, a security attribute that is associated with the physical memory address and indicates whether a device associated with the device ID is permitted to access the location indicated by the physical memory address; and
   an access controller coupled to the memory management unit and configured to selectively access the location in the memory indicated by the physical memory address based at least in part on the security attribute, and one or more access control rules associated with the device ID.

8. The memory controller of claim 7, wherein the selective access to the location indicated by the physical memory address is further based on a type of access including at least one of a read access, a write access, or a protected memory access.

9. The memory controller of claim 8, wherein the access controller is further configured to access the location indicated by the physical memory address with the access control rules for the device ID.

10. The memory controller of claim 7, wherein the page table is stored within a protected partition of the memory.

11. The memory controller of claim 10, wherein the access controller is further configured to selectively access the protected partition of the memory based on a protected access indicator included in the memory access request.

12. The memory controller of claim 7, wherein the memory is separate from the memory controller.

13. A memory controller comprising:
means for receiving a memory access request including a virtual memory address and a device identifier (ID);
means for receiving, from a page table in a memory, a physical memory address that is associated with the virtual memory address and indicates a location in the memory;
means for receiving, from the page table, a security attribute that is associated with the physical memory address and indicates whether a device associated with the device ID is permitted to access the location indicated by the physical memory address; and
means for responding to the memory access request by selectively accessing the location in the memory indicated by the physical memory address based at least in part on the security attribute, and one or more access control rules associated with the device ID.

14. The memory controller of claim 13, wherein the selective access to the location indicated by the physical memory address is further based on a type of access associated with the memory access request, the type of access including at least one of a read access, a write access, or a protected memory access.

15. The memory controller of claim 14, wherein the means for responding comprises:
accessing the location indicated by the physical memory address with the access control rules for the device ID.

16. The memory controller of claim 13, wherein the page table is stored within a protected partition of the memory.

17. The memory controller of claim 16, wherein the selective access to the protected partition of the memory is based on a protected access indicator included in the memory access request.

* * * * *